May 12, 1942.     H. G. MOORE ET AL     2,282,874
POWER SYSTEM INCLUDING ROTARY TRANSFORMER
Filed Feb. 20, 1941     2 Sheets-Sheet 1

Fig.1.

Inventors:
Harold G. Moore,
Fremont Felix,
by *Harry E. Dunham*
Their Attorney.

Inventors:
Harold G. Moore,
Fremont Felix,
by Harry E. Dunham
Their Attorney.

Patented May 12, 1942

2,282,874

UNITED STATES PATENT OFFICE 2,282,874

POWER SYSTEM INCLUDING ROTARY TRANSFORMERS

Harold G. Moore, Wesleyville, Pa., and Fremont Felix, Schenectady, N. Y., assignors to General Electric Company, a corporation of New York Application February 20, 1941, Serial No. 379,794

20 Claims. (Cl. 172—179)

Our invention relates to power systems including direct-current rotary transformers of the armature reaction excitation type, and more particularly to power systems wherein the driving motors are connected between the primary and secondary brushes of the rotary transformers.

Various systems have been devised for providing smooth acceleration of direct-current motors adapted to be connected substantially directly across the source of electrical power supply through a device or devices which inherently regulate the electrical potential and current of the motors during acceleration and normal running and which also utilizes the motors to provide a retarding or braking force. It has been found that these characteristics can readily be obtained in a power system using a rotary transformer of the armature reaction excitation type connected to the source of power supply with a proper arrangement for connecting each of the driving motors across a brush of the transformer primary brushes and a brush of the transformer secondary brushes. This general type of system has been described in detail in U. S. Patent No. 1,969,699, J. M. Pestarini, wherein a metadyne rotary transformer is used to supply the power to driving motors connected as described above. Such a system provides two load loop circuits through the armature of the rotary transformer and includes an external load in each loop and has been termed an "8-connection". One of the difficulties which has been encountered in such a system is to insure against the generation of too high a voltage by the motors during regenerative braking and also to provide for the absorption of power generated by the motors during braking periods when the connection between the transformer primary brushes and the source of power supply may be broken or when a short-circuit may occur on the source of power supply.

An object of our invention is to provide a power system having an arrangement for utilizing the driving motors to provide a retarding or braking force to a driven vehicle and to insure the absorption of the power generated during these periods.

Another object of our invention is to insure against the application of excessive voltages to the brushes of a rotary transformer by the driving motors during braking operation.

A further object of our invention is to provide a smooth acceleration of the driving motors when connecting this type system to a source of electrical power supply for motoring purposes.

Further objects and advantages of our invention will become apparent and our invention will be better understood from the following description referring to the accompanying drawing, and the features of novelty which characterize our invention will be pointed out with particularity in the claims annexed to and forming part of this specification.

Figure 1:
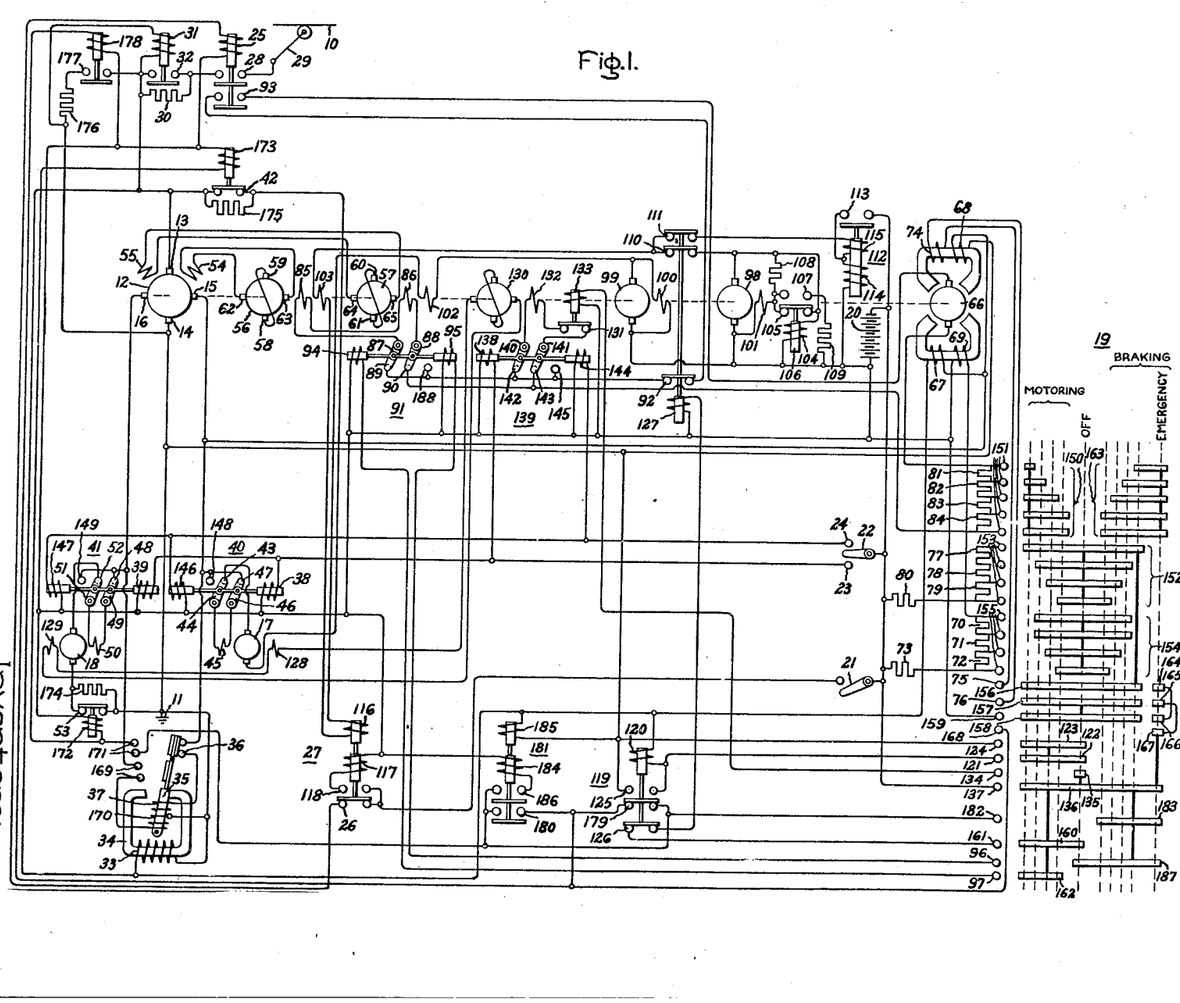
Fig. 1 illustrates a power system wherein an armature reaction excited rotary transformer is adapted to supply power from a source of power supply to driving motors connected to the transformer in "figure 8" connection and including starting and braking resistances with an arrangement for connecting these resistances to provide the desired operating characteristics to the system.

Referring to the drawings, we have shown a power system particularly adapted for use in driving traction vehicles. Electrical power is adapted to be supplied to the vehicle from a third rail or trolley 10 with one side grounded as at 11. An armature reaction excited dynamo-electric machine such as a rotary transformer 12 having an armature and a commutator is provided with primary brushes 13 and 14 adapted to be connected to the source of power supply and secondary brushes 15 and 16 electrically displaced about the commutator from the primary brushes 13 and 14. An electrical load comprising a driving motor 17 is adapted to be connected to the primary brush 13 and the secondary brush 15 and another driving motor 18 is adapted to be connected between the secondary brush 16 and the primary brush 14 so as to form two load loops including a driving motor connected in each of the load loops between a primary brush and a secondary brush of the transformer primary and secondary brush sets.

A master controller 19 is provided for manually controlling the sequence of operation of the system including controlling the driving motors 17 and 18 to provide either motoring, braking, or no torque to the vehicle axles. A separate source of electrical power supply including a battery 20 is provided for energizing the exciting coils of various relays arranged to control the operation of the system. In addition, a main control switch 21 is provided for connecting and disconnecting the battery 20 to various parts of the system which are adapted to be energized by the battery. In most vehicles, it is desirable to provide for the driving of the vehicle in forward and in reverse directions. This can readily be done in a vehicle propelled by electric motors by reversing the direction of the field excitation with respect to the armature to obtain two directions of rotation of the motors. In order to obtain this two-way rotation of the driving motors 17 and 18, a two-way switch 22 is adapted to contact terminals 23 and 24 to which motor controlling switches are connected. When the master controller 19 is in the "off" position and the control switch 21 is closed with the switch 22 closed on the contact 23, a circuit is formed impressing the voltage of the battery 20 across a main line relay exciting coil 25 through the control switch 21, a set of contacts 26 of an overload relay 27 to the coil 25, and back to the other side of the battery 20. The energization of the coil 25 closes a circuit through a set of contacts 28 connected to the trolley or third rail shoe 29 arranged in contact with the supply line 10. The closing of the contacts 28 connects the line 10 to the primary brush 13 of the rotary transformer 12 through a starting resistance 30, thereby impressing a reduced voltage across the primary brushes 13 and 14 of the rotary transformer, so as to minimize current surges when connecting the rotary transformer to the source of electrical power supply. The closing of the contacts 28 also impresses a voltage across an exciting coil 31 of a relay, the contacts of which are connected across the starting resistance 30, so that as the starting current taken by the rotary transformer decreases when the speed of the transformer increases and the drop across the starting resistance 30 correspondingly decreases, the voltage across the exciting coil 31 increases sufficiently to energize the relay and close a circuit across the relay contacts 32, thereby short-circuiting the starting resistance 30 and applying full line voltage between the line 10 and ground across the primary brushes 13 and 14 of the rotary transformer 12. With the relay contacts 28 and 32 closed, an exciting coil 33 of a polarized relay is connected directly across the source of electrical power supply between the line 10 and ground 11, so as to energize a magnetic core 34 of the relay and attract a magnetic armature 35 thereof, as shown in the drawings, to close a circuit through a set of contacts 36 connected between the secondary brush 15 and an exciting coil 37 on the relay armature 35. This exciting coil 37 is adapted to energize the armature 35 of the polarized relay in such a direction as to maintain it in the position shown in the drawings under all conditions of operation wherein the voltage of the secondary brush 15 does not fall below ground potential; that is, as long as the voltage between the primary brush 13 and the secondary brush 15 of the rotary transformer 12 does not exceed the voltage of the main source of electrical power supply.

In starting this type of power system, the main control switch 21 is closed and the master controller 19 is placed in its "off" position. Under these conditions, the circuits explained above are energized, and as explained in U. S. Patent 1,969,699, J. M. Pestarini, the voltage of the secondary brush 15 is the same as the voltage of the primary brush 13 and the voltage of the secondary brush 16 is the same as the voltage of the primary brush 14 when the primary brushes are first connected across the source of electrical power supply. Thus, it is not necessary to disconnect the driving motors from the brushes of the rotary transformer, as substantially no voltage is impressed across the motors 17 and 18 under these starting conditions. Thus, when forward motion is desired, the switch 22 is closed upon the contact 23 to energize exciting coils 38 and 39 of switches 40 and 41 to complete a circuit from the primary brush 13 of the rotary transformer through contacts 42 of a deenergized short-circuiting relay through the driving motor 17 to a contact 43, a contactor 44, a motor series field exciting winding 45, a contactor 46, a contact 47, to the secondary brush 15 of the rotary transformer, and the motor 18 is connected to the secondary brush 16 of the rotary transformer through a relay contact 48, a contactor 49, a series field exciting winding 50, a contactor 51, contact 52, to the commutator of the driving motor 18, and through the contacts 53 of another short-circuiting relay to the primary brush 14 of the rotary transformer. The energizing coils 38 and 39 of the switches 40 and 41, respectively, are energized by the battery 20 and operate the switches 40 and 41, respectively, to the positions shown in the drawings to provide the above circuits. In order to provide for a plurality of operating patterns, that is, to provide for a plurality of accelerating and decelerating curves, control field exciting windings 54 and 55 are arranged to provide a controlling component of excitation to the rotary transformer 12. These control field exciting windings are energized in accordance with the desired characteristics so as to vary the voltage between the primary and secondary brushes of the rotary transformer to control the voltage impressed upon the driving motors 17 and 18, and the energization of these control field exciting windings is supplied by auxiliary armature reaction excited dynamo-electric machines 56 and 57, respectively, of the type generally known as metadyne generators. These machines 56 and 57 are provided with sets of primary brushes 58 and 59 and 60 and 61, respectively, which are short-circuited to provide a substantially constant potential across these brushes of zero value. These auxiliary dynamo-electric machines 56 and 57 are adapted to induce a voltage across sets of secondary brushes 62 and 63 and 64 and 65 thereof. These respective sets of secondary brushes are connected across the field exciting windings 54 and 55 and provide an energization thereto which varies in accordance with the desired operating characteristics of the rotary transformer. In order to obtain these field exciting winding energizing voltages, the auxiliary machines 56 and 57 are provided with a plurality of field exciting windings to provide various components of excitation to these machines, and these various components of magnetic excitation are composed or combined within these auxiliary machines. By thus combining a plurality of components in small auxiliary machines, it is possible to obtain a more rapid response by controlling relatively small values of electric current.

Figure 2:
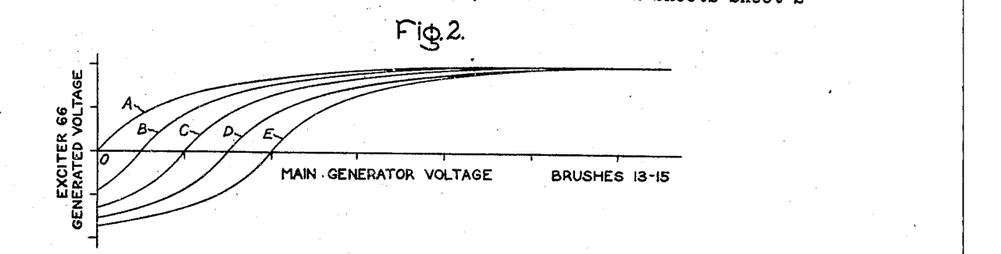
Figs. 2 and 3 show characteristic curves of an exciter of the system when certain of its field exciting windings are energized.
Figure 3:
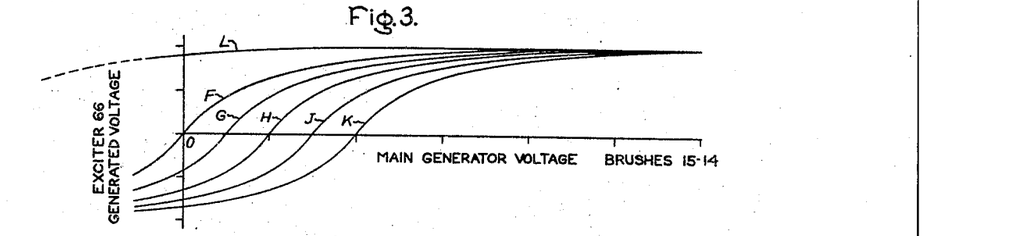
Figure 4:
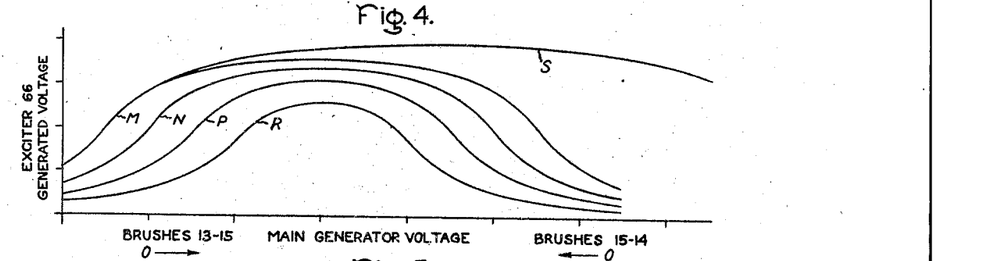
Figs. 4 and 5 are the resultant operating characteristics thereof.
Figure 5:
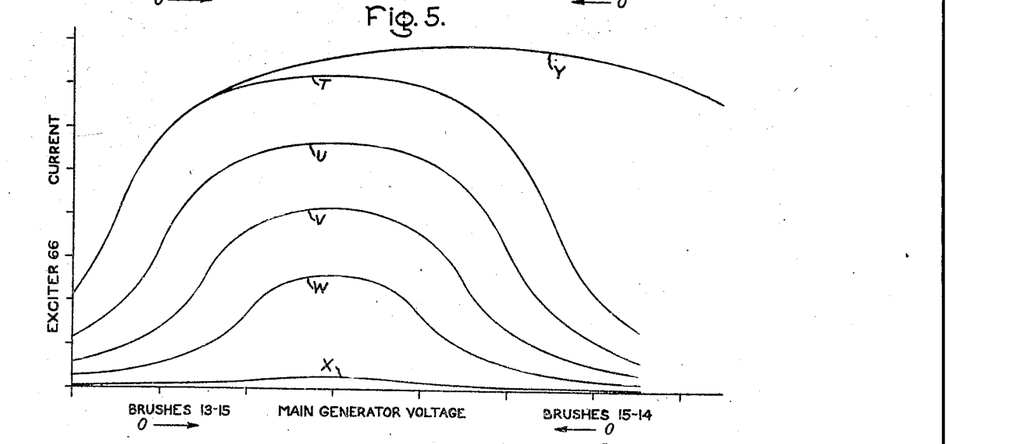

In order to obtain this desired excitation for the auxiliary composing dynamo-electric machines 56 and 57, a pattern dynamo-electric machine 66 is provided which is adapted to energize field exciting windings of the composing auxiliary dynamo-electric machines and is arranged to provide different voltage characteristics for energizing the field exciting windings in accordance with the different positions of the master controller 19. This pattern dynamo-electric machine 66 is provided with two substantially magnetically independent exciting systems constructed so as to saturate magnetically at low values of excitation. A field exciting winding 67 is connected to the primary brush 13 and the secondary brush 15 of the rotary transformer 12 so that its energization varies in accordance with the voltage across the driving motor 17 and is arranged on one of these magnetic excitation systems, and a second field exciting winding 68 is provided on the other excitation system and is connected to the primary brush 14 and the secondary brush 15 of the rotary transformer 12, so that its energization varies inversely with respect to the voltage across the driving motors. The components of voltage which would be generated by the pattern exciter 66 due to the respective field exciting windings 67 and 68 are represented by curves A and F of Figs. 2 and 3, respectively. A third field exciting winding 69 is arranged to provide a component of excitation to the pattern dynamo-electric machine 66 in opposition to the excitation of the field exciting winding 67 and is adapted to be connected across the battery 20 through a series of resistance steps 70, 71, and 72 and a fixed resistor 73. The variable resistance steps 70, 71 and 72 are adapted to be shunted out of the circuit through contacts on the master controller. The resultant component voltages produced by the various energizations of the field exciting winding 69 and the winding 67 are represented by the curves B, C, D, and E of Fig. 2. A fourth field exciting winding 74 is arranged to provide another component of excitation to the pattern dynamo-electric machine 66 in opposition to the excitation of the field exciting winding 68 and is connected to contacts 75 and 76 of the master controller through which it is adapted to be connected through a series of variable resistance steps 77, 78, and 79, and a fixed resistance 80 across the battery 20. In addition to varying the energization of the field exciting winding 74 by the master controller through the variable resistance steps 77, 78, and 79, the contacts 75 and 76 are arranged to be energized through contactors of the master controller so that the energization of the field exciting winding 74 also may be reversed in direction for emergency braking operating conditions of the motors as controlled by the master controller 19. The resultant component voltages produced by the various energizations of the field exciting winding 74 and the winding 68 are represented in Fig. 3 by the curves G, H, J and K for motoring and regenerative braking and by curve L for emergency dynamic braking. The total or net voltage generated by the pattern dynamo-electric machine exciter 66 is the sum of the component voltages represented by the curves in Figs. 2 and 3. Since the field exciting windings 69 and 74 are never completely de-energized, there is no net voltage corresponding to curves A and F. Furthermore, the voltages applied to the field exciting windings 67 and 68 are complementary, that is, as the voltage across one increases, the voltage across the other decreases correspondingly, the algebraic sum of these two voltages being equal to the transformer primary voltage across the brushes 13 and 14. Thus, the total or net generated voltage of the pattern exciter 66 may be represented in Fig. 4 by curves M, N, P, and R for motoring and regenerative braking and by curve S for emergency dynamic braking. Curve R also represents the voltage characteristic for the "off" position of the master controller 19. The energization provided by this pattern dynamo also is arranged to be varied by a series of steps of resistance 81, 82, 83, and 84 connected to contacts on the master controller 19 and to field exciting windings 85 and 86 on the auxiliary composing dynamo-electric machines 56 and 57, respectively. These field exciting windings 85 and 86 are adapted to be connected to the pattern dynamo-electric machine 66 through the master controller and its associated resistances, through the contactors 87 and 88 and contacts 89 and 90 of a switch 91, contacts 92 of an under voltage relay, and through contacts 93 of the main control relay. The energization of these field exciting windings 85 and 86 is adapted to be reversed for motoring and braking operating conditions by the switch 91. This switch is controlled by a pair of operating coils 94 and 95 which are energized by the battery 20 through contacts 96 and 97 on the master controller 19 for actuating the switch 91 to the position shown in the drawings for motoring operation of the driving motors, or for actuating the switch 91 to reverse the connections of the field exciting windings 85 and 86 when the master controller is in the "off" or "braking" positions. The energization of these windings is determined by the current output patterns of the exciter 66 and is related to the voltage patterns of Fig. 4 by the resistance of the load circuit. These current patterns are represented in Fig. 5 by curves T, U, V, and W for motoring and regenerative braking, curve X for the "off" position of the controller 19, and curve Y for emergency dynamic braking.

It also is desirable that the speed of the rotary transformer 12 should be maintained substantially constant at a predetermined value to obtain the desired transformer action. This may be obtained by regulating a component of excitation of the machine by any suitable speed responsive device, so as to increase or decrease the input to the transformer to maintain substantially constant speed. In the illustrated arrangement, an auxiliary generator 98, regulated at substantially constant voltage, is arranged in parallel with an unsaturated auxiliary generator 99 and connected thereto, so that the voltages of the two auxiliary generators 98 and 99 are substantially equal and opposite when the rotary transformer 12 operates at its predetermined desired speed. These two generators 98 and 99, as well as the auxiliary metadyne generators 56 and 57 are mechanically driven by the rotary transformer 12 in a predetermined speed relationship with respect to the speed thereof. The unsaturated auxiliary generator 99 is provided with a shunt field exciting winding 100 connected across the terminals thereof, so that its excitation varies in accordance with the voltage and the speed of the generator 99, and thereby provides a large variation in the voltage across the generator 99 for any given change in speed thereof. The auxiliary generator 98 is provided with a field exciting winding 101 which also is adapted to be connected across the terminals of the generator 98, but this field exciting winding is arranged to provide an excitation to this machine such that, over a very wide range of speed, the generator 98 will provide a substantially constant voltage. These two generators are connected across a field exciting winding 102 on the auxiliary exciter 57 and a field exciting winding 103 on the auxiliary exciter 56. Since the voltages of the two auxiliary generators 98 and 99 are substantially equal and opposite at the desired operating speed of the rotary transformer 12, the field exciting windings 102 and 103 are not energized when the rotary transformer is operating at its desired substantially constant speed. However, if the load on the rotary transformer increases such that its speed decreases, the voltage of the auxiliary generator 99 decreases very rapidly and the difference between its voltage and that of the substantially constant voltage auxiliary generator 98 impresses a potential across the field exciting windings 102 and 103, so as to excite auxiliary exciters 57 and 56 to produce an energization of the field exciting windings 55 and 54, respectively, which will tend to increase the input to the rotary transformer 12 and restore its speed to normal operating conditions. On the other hand, as the speed of the rotary transformer increases above a predetermined desired value, the voltage of the auxiliary generator 99 will exceed that of the substantially saturated generator 98 and cause a current to flow in the opposite direction through the field exciting windings 103 and 102, such that the voltage impressed across the field exciting windings 54 and 53 will energize these field exciting windings of the rotary transformer so as to decrease the speed thereof until the voltages of the auxiliary generators 98 and 99 again are substantially equal. In order to insure that the voltage of the auxiliary generator 98 remains substantially constant, a voltage regulator is provided which includes an exciting coil 104 connected across the terminals of the auxiliary generator 98 such that the field exciting winding 101 of this generator is connected thereacross through contacts 105. However, if the voltage across the generator 98 exceeds a predetermined value, the exciting coil 104 of the voltage regulator energizes the armature 106 thereof so as to close a circuit through a pair of contacts 107 and place the field exciting winding 101 across a pair of resistances 108 and 109 which will decrease the energization of the field exciting winding 101 and reduce the voltage of the auxiliary generator 98.

In order to keep the battery 20 fully charged, the auxiliary generator 98 also is used as a battery charging generator. One terminal of the generator 98 is connected directly to the terminal of the battery 20 with the voltage of the generator in opposition to that of the battery, and the other terminal of the generator is connected to the other terminal of the battery through a pair of contacts 110 and another pair of contacts 111 through a reverse current relay 112 having a pair of contacts 113. When the voltage of the generator 98 is such as to charge the battery 20, a current flows from the generator through an exciting coil 114 of the reverse current relay 112, so as to close a circuit through the relay contacts 113 and impresses the voltage of the generator 98 across the battery 20. Should the voltage of the generator 98 fall below the voltage of the battery 20, an exciting coil 115 of the relay 112 will be energized by current flowing from the battery to the generator 98, so as to oppose the excitation of the exciting coil 114 and deenergize the armature of the reverse current relay 112, so as to open the circuit through the contacts 113, thereby preventing the reverse flow of current and discharge of the battery 20 through the auxiliary generator 98.

Under certain conditions of operation, the overload on the rotary transformer 12 may become excessive, so that the speed regulating arrangement including the auxiliary generators 98 and 99 may not be adequate to provide the desired speed regulation. In order to insure against damage due to excessive overloads, the overload relay 27 is provided with an energizing coil 116 which is connected in series with the field exciting windings 102 and 103 in circuit with the auxiliary speed regulating generators 98 and 99, so that if the overload on the rotary transformer 12 is such as to reduce the speed thereof below a predetermined value, the overload relay exciting coil 116 becomes sufficiently energized so as to operate the relay to open the contacts 26 and deenergize the exciting coil 25 of the main line relay. This opens the main line contacts 28 of the relay, thereby disconnecting the entire system from the main source of electrical power supply 10. A holding coil 117 is arranged on the overload relay 27, so that when the relay is operated by the exciting coil 116 to disconnect the system from the main source of electrical power supply, the circuit of the exciting coil 117 is closed through a set of contacts 118 of the overload relay 27 across the battery 20. Thus, the system becomes inoperative under heavy loads until the overload relay 27 is reset by opening the main control switch 21 to deenergize the holding coil 117 of the overload relay, and then reclosing the main control switch 21.

Under certain other operating conditions, the voltage across the primary brushes 13 and 14 of the rotary transformer 12 may fall below a predetermined value, so that the system no longer can operate as desired. This may result from a short circuit on the main source of electrical power supply or from a loss of line voltage due to a break in the connection between the contactor trolley or shoe 29 and the trolley wire or third rail 10. Under these conditions, it is desirable that the auxiliary load which is driven by the rotary transformer 12 should be removed therefrom and an under-voltage relay 119 is arranged to control this operation. With the master controller in the "off" position, an exciting coil 120 of the under-voltage relay 119 is connected across the main source of electrical power supply 10 through the relay contacts 28 and 32 and to ground through a contact 121 and two interconnected fingers 122 and 123 and contact 124, all of the master controller 19. Energization of the exciting coil 120 operates the under-voltage relay so as to close a set of contacts 125 and provide a holding circuit for the exciting coil 120 for all positions of the master controller. In this position, the under-voltage relay also opens a circuit through a set of contacts 126 connected in series with an exciting coil 127 arranged to energize an unloading relay including the contacts 92, 110, and 111. When the exciting coil 127 is thus deenergized, the circuits through the contacts 92, 110 and 111 are closed, thereby placing an auxiliary load upon the rotary transformer 12. If the master controller 19 is turned to motoring or "off" positions and the voltage across the primary brushes 13 and 14 of the rotary transformer 12 should fall below a predetermined value for any of the reasons such as those indicated above, the exciting coil 120 is not sufficiently energized to hold the under-voltage relay 119 in a position to close the circuit through the contacts 125, and the contactors of this relay then will close a circuit through the contacts 126 so as to energize the exciting coil 127 of the unloading relay. This will cause the unloading relay to open the circuits through the contacts 92, 100, and 111, so as to deenergize the field exciting windings 85 and 86 of the composing exciter generators 56 and 57 and also open the circuit between the auxiliary generator 98, the battery 20, and the auxiliary generator 99 through the field exciting windings 102 and 103, thereby removing all of the auxiliary load which is supplied by auxiliary machines driven by the rotary transformer 12. With the master controller 19 in braking position, this operation is prevented by opening the power supply to contact 126 of the under-voltage relay 119 at the finger 161 of the master controller.

When the master controller is in the "off" position, it is desirable that the driving motors should provide no torque, and this condition may be obtained if the fields and the armatures of the driving motors both are substantially deenergized. Since the motors are permanently connected across the brushes of the rotary transformer, it is necessary that the voltage across the motors be reduced to zero, and this can be provided by reducing the voltage of the pattern exciter 66 substantially to zero by actuating the switch 91 to its braking position by energizing the coil 95 from contact 96 of the master controller 19 and the output of the pattern exciter 66 also is reduced substantially to zero, as indicated by curve X in Fig. 5. This results in the voltage of brush 15 becoming the same as that of the brush 13 and the voltage of the brush 16 the same as that of brush 14, as has been explained above, so that substantially no current flows through the armatutre and the series field exciting windings 45 and 50 of the driving motors 17 and 18, respectively. The motors 17 and 18 also are provided with separately excited field exciting windings 128 and 129 connected across an auxiliary armature reaction excited generator 130 and slight fluctuations in the main supply-line voltage might produce torque in the driving motors 17 and 18 if these separately excited field exciting windings 128 and 129 are energized. In order to insure against the excitation of the driving motors by these separately excited field exciting windings, a relay having contacts 131 is provided for controlling the energization of a control field exciting winding 132 on the motor field exciter 130. This field exciting winding 132 is adapted to be energized by the pattern dynamo-electric machine 66, so that the excitation of the separately excited field exciting windings 128 and 129 of the motors will vary in accordance with the variation of the voltage generated by the pattern dynamo-electric machine 66. The relay contacts 131 are adapted to be closed under all conditions of operation, except when the master controller is in the "off" position, under which conditions, an exciting coil 133 is arranged to be energized from the battery 20 through a contact 134, a finger 135, electrically connected to a finger 136 and a contact 137, all of the master controller, so as to operate the relay and open the circuit between the contacts 131, thereby deenergizing the field exciting winding 132. This deenergization of the field exciting winding 132 of the motor exciter 130 results in the deenergization of the separately excited field exciting windings 128 and 129 of the motors so that substantially no torque will be developed by the motors. The excitation of the separately excited motor field exciting windings 128 and 129 also is reversed relatively to the motor armatures for reverse motor operation and is controlled by the same direction control switch 22 which controls the relative connections of the series field exciting windings. If the switch 22 is closed upon the contact 23, the switch operating coils 38 and 39 are energized, so as to operate the switches 40 and 41, respectively, as shown in the drawings. Furthermore, this energizes an operating coil 138 of a switch 139, so as to actuate this switch to energize the field exciting winding 132 of the motor field exciter 130 by the pattern dynamo-electric machine 66 through contactors 140 and 141 which can be in circuit through contacts 142 and 143. If it is desired to have the driving motors operate in the reverse direction, the main control switch 22 is closed upon the contact 24, so as to energize an operating coil 144 of the switch 139 to actuate this switch and close the contactor 141 on a contact 145 and close the contactor 140 on the contact 143, thereby reversing the energization of the field exciting winding 132 of the motor field exciter 130. This reverses the energization of the motor field exciting winding 128 and 129 and thereby reverses the excitation provided by these field exciting windings with respect to the motor armatures 17 and 18. Furthermore, switch operating coils 146 and 147 of the switches 40 and 41 are energized so as to operate the switches 40 and 41 to close the contactor 44 on a contact 148, contactor 46 on contact 43, contactor 49 on contact 52, and a contactor 51 on a contact 149, thereby reversing the energization of the field exciting windings 45 and 50, respectively. Thus, when the direct control switch 22 is closed upon the contact 24, all of the field exciting windings of the motors are reversed with respect to the armatures of the motors and a reverse rotation is provided. In order to obtain an accelerating or motoring torque from the motors 17 and 18, the master controller 19 is arranged to be operated, so that the pattern dynamo-electric machine 66 will provide the desired excitation to the auxiliary exciter dynamo-electric machines 56 and 57 in order to control the energization of the field exciting windings 54 and 55 to impress the desired voltage upon the driving motors. The excitation of the transformer exciters 56 and 57 is controlled by a plurality of fingers 150 of the master controller 19 which is adapted to contact a corresponding plurality of contacts 151 to vary the resistance connected in series with the field exciting windings 85 and 86 of the transformer exciters 56 and 57. The excitation of the control fields 85 and 86 of the transformer exciters also is varied by controlling the excitation of the pattern dynamo-electric machine 66 by a plurality of fingers 152 which is arranged to engage contacts 153 to vary the resistance in series with the field exciting winding 74 on the pattern dynamo-electric machine 66. The circuit on the field exciting winding 74 is completed through contacts 75 and 76 arranged to be engaged by fingers 156 and 157 and through a finger 158 arranged to engage a contact 159 of the master controller 19. Furthermore, the excitation of the pattern dynamo-electric machine 66 is varied by a plurality of fingers 154 arranged to engage a plurality of contacts 155 to vary the resistance in series with the field exciting winding 69 of the pattern dynamo-electric machine 66.

For all motoring positions of the master controller 19, the fingers 122 and 123 engage the contacts 121 and 124 to provide for the energization of the under-voltage relay exciting coil 120. During motoring operation of the system, the exciting coil 133 of the relay which controls the energization of the motor field exciting winding 132 is adapted to be deenergized, while the finger 136 is adapted to engage the contact 137 and is electrically connected to a finger 160 arranged to engage a contact 161 to complete the circuit of the unloading relay exciting coil 127 across the battery 20. The finger 136 also is electrically connected to a finger 162 arranged to engage contact 97 to energize the operating coil 94 of the switch 91, as explained above.

With this type system, it is desirable that the traction motors be adapted to provide a retarding or braking force to assist in stopping the vehicle. For this purpose, the master controller 19 is provided with four braking positions and an additional emergency braking position. Under normal braking conditions, the master controller may be moved to any of its four normal braking positions to vary the rate of deceleration of the vehicle by varying the energization of the rotary transformer control field exciting windings 54 and 55. The energization of these field exciting windings for braking purposes is reversed by energization of the coil 95 of the switch 91 through master controller contact 96, fingers 187 and 136, and contact 137, so that switch contactor 87 engages contact 90 and contactor 88 engages contact 188 and is varied by varying the energization of the control field exciting windings 85 and 86 of the transformer exciters 56 and 57 by varying the resistance in series with these field exciting windings through a plurality of fingers 163 arranged to engage the contacts 151 connected across the resistances 81 to 84 inclusive. Furthermore, the energization of the control field exciting windings 85 and 86 is varied by varying the excitation of the pattern dynamo-electric machine 66 in the same manner as the excitation of this machine is varied for motoring purposes. In the emergency braking position of the master controller 19, all of the resistance in series with the field exciting windings 85 and 86 of the transformer exciters is short-circuited through the fingers 163 and the contacts 151 and the excitation of the field exciting winding 74 on the pattern dynamo-electric machine is reversed through fingers 164, 165, 166, 167, and 136 arranged to engage contacts 75, 76, 159, 168, and 137, respectively, so as to control further the excitation of these field exciting windings 85 and 86. The effect of the emergency braking described above is to reverse the polarity of the field exciting winding 74 on the pattern exciter 66, so as to produce a cumulative excitation with that of the field exciting winding 68 and to modify the pattern to provide a characteristic as shown by curve Y of Fig. 5. Under normal operating conditions when braking, the motors 17 and 18 will remain connected across the brushes of the rotary transformer 12 which operates to generate a voltage slightly in excess of the voltage of the main source of electrical power supply 10 to provide regenerative braking. This condition will remain satisfactory for regenerative braking providing the voltage of the driving motors does not exceed the voltage of the electrical power supply by too great a value; that is providing the voltage of the driving motors does not exceed by too great a value the voltage impressed by the line 10 across the primary brush and the secondary brush to which these motors are connected. It is quite possible, however, that the voltage generated by the traction motors may exceed this predetermined value, as this voltage is dependent on the vehicle speed and the excitation of the motor as determined by the master controller 19. In order to maintain the stability of the system, it is desirable to provide an emergency load absorbing device which may be connected between the traction motor and the brush of the rotary transformer, so as to reduce the voltage impressed by the motor across the brushes of the transformer. This over-voltage condition will result during braking when the vehicle is traveling above a predetermined speed. The polarized relay also will operate to close contacts 169 and 171 any time the potential of brush 15 falls below that of brush 14, whether during acceleration or braking. However, coils 172 and 173 may be energized only when contact 182 engages contactor segment 163, that is, only for a braking position of the master controller 19. During braking, if the potential of the secondary brush 15 becomes lower than the potential of the primary brush 14, the current through the exciting coil 37 of the polarized relay will be reversed in direction and the armature 35 will be actuated in the opposite direction from that shown in the drawings. When in this position, the polarized relay closes a circuit through contacts 169, so as to energize an exciting coil 170 on the polarized relay armature 35 to maintain the relay in this position as long as the voltage of the secondary brush 16 remains above the voltage of the primary brush 14. In this position, the polarized relay also closes a circuit through contacts 171, so as to energize relay coils 172 and 173 and thereby open the circuits through the contacts 53 and 42, inserting emergency braking resistances 174 and 175 between the driving motors 18 and 17, respectively, and the brushes of the rotary transformer 12. When these emergency braking resistances are inserted in series with the motors, the voltage of the motors impressed across the brushes of the rotary transformer is decreased to a value below that of the main source of electrical power supply. After this operation of the polarized relay and during the reduction of speed during braking, the potential of brush 16 falls below that of brush 14. Thereupon, the polarized relay again returns to the position shown in Fig. 1, and opens contact 171 and deenergizes coils 172 and 173, cutting out the emergency braking resistors 174 and 175 from the motor circuits.

Under certain circumstances, as when contact may be lost between the power system and the source of electrical power supply as the trolley or shoe 29 becomes disconnected from the trolley wire or third rail 10 or when a short-circuit occurs across the source of electrical power supply, it is desirable that a braking force may still be obtained by use of the traction motors acting as generators. Under these conditions, dynamic braking is provided by connecting a main load absorbing resistor 176 across the primary brushes 13 and 14 of the rotary transformer 12. This connection of the main load absorbing resistor 176 is obtained by closing a set of contacts 177 by a relay, the exciting coil 178 of which is energized under emergency braking conditions through the master controller contact 168, finger 167, finger 136, and contact 137. Under other braking conditions, the exciting coil 178 is connected across the battery 20 through a set of contacts 179 of the under-voltage relay 119 or through another set of contacts 180 of an over-voltage relay 181. The circuit through the under-voltage relay 119 is completed through a contact 182 and a finger 183 of the master controller, which is electrically connected to the finger 136 arranged to engage contact 137 connected to the battery 20. The contacts 179 of the under-voltage relay are closed whenever the voltage of the main source of electrical power supply falls below a predetermined value, so that the circuit will be closed through these contacts under this condition. Furthermore, if contact with the main source of electrical power supply is lost, the voltage which the motors will impress across the primary brushes of the rotary transformer 12 will exceed a predetermined value and a holding coil 184 of the over-voltage relay will maintain closed the circuit through the contacts 180 of this relay. The over-voltage relay 181 is operated by an exciting coil 185 which is energized by the voltage between primary brushes 13 and 14 of the rotary transformer 12. When this exciting coil 185 is energized above a predetermined value, it actuates the over-voltage relay, so as to close a set of contacts 186 which completes a circuit through a holding coil 184, which thereafter maintains closed the contacts of the over-voltage relay for all operating conditions of the power system until such a time as the master controller is turned to the "off" or any motoring position. With this relay closed, the main load absorbing resistor relay exciting coil 178 circuit is closed across the battery 20 during braking through the contacts 180 of the over-voltage relay and the master controller contact 182, fingers 183 and 136, and contact 137.

Thus, it is seen that we have provided a power system wherein gradual acceleration of the driving motors may be provided in opposite directions by a master controller and associated control circuits, and gradual electric braking also may be controlled by the master controller and its associated circuits through the driving motors irrespective of whether or not the system is connected to the main source of electrical power supply, so that the operator may obtain a smooth operation of the power system under all varying load conditions While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States, is:

1. In a control system for an electric vehicle, the combination of an armature reaction excited rotary transformer having a commutator and sets of primary brushes and secondary brushes displaced with respect to each other about said commutator, a driving motor, means for connecting said driving motor across a brush of said primary brushes and a brush of said secondary brushes, a main load absorbing braking resistance, control means for connecting said resistance in series circuit with said primary brushes to establish dynamic braking operation, an emergency braking resistance, means for connecting said emergency braking resistance in series circuit with said motor, and means dependent on the speed of said motor for controlling the amount of said resistances connected in series circuit with said motor when said control means is operated to establish dynamic braking operation.

2. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, an 8-connected motor load on said transformer, an emergency electrical load absorbing means including an emergency braking resistor, means for inserting and removing said emergency load absorbing means in circuit with said motor load between said motor load and said transformer, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

3. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means for controlling the power output of said transformer, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

4. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, means including a starting resistance for reducing current surges when said transformer primary brushes are connected by said last-mentioned means to said source of electrical power supply, means dependent upon the voltage across said primary brushes for automatically short-circuiting said starting resistance, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means including an emergency braking resistor, and means dependent on the electrical potential across one of said motors for inserting and removing said emergency load absorbing means in circuit with said one of said motors between said motor and said dynamo-electric transformer brushes.

5. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means for controlling the rate of acceleration of said driving motors, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

6. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means for controlling the rate of braking provided by said driving motors, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

7. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means including a control field exciting winding on said transformer for controlling the power output of said transformer, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor means in circuit with said main load absorbing means for connecting said main load absorbing means across said primary brushes, and means dependent on the electrical potential across said primary brushes for opening and closing the circuit of said main load absorbing means circuit connecting means.

8. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, a field exciting winding for said transformer, means including an auxiliary dynamo-electric machine arranged to energize said transformer field exciting winding for controlling the rate of acceleration of said driving motors, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

9. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, means including a starting resistance for reducing current surges when said transformer primary brushes are connected by said last-mentioned means to said source of electrical power supply, means dependent upon the voltage across said primary brushes for automatically short-circuiting said starting resistance, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means including an emergency braking resistor, means for inserting and removing said emergency load absorbing means in circuit with one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

10. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means dependent on the load on said transformer for disconnecting said primary brushes from said source of electrical power supply, a main control circuit breaker arranged to make and break all of the control circuits of said power system, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

11. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an auxiliary dynamo-electric machine for controlling the rate of acceleration of said driving motors, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

12. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, means including a starting resistance for reducing current surges when said transformer primary brushes are connected by said last-mentioned means to said source of electrical power supply, means dependent on the voltage across said primary brushes for automatically short-circuiting said starting resistance, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means for remotely controlling the direction of rotation of said driving motors, an emergency electrical load absorbing means including an emergency braking resistor, means for inserting and removing said emergency load absorbing means in circuit with one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuiting connecting means.

13. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means dependent on the speed of said transformer for controlling the power output thereof, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

14. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, a control field exciting winding for said transformer, means including an auxiliary armature reaction excited dynamo-electric machine arranged to energize said control field exciting winding, an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

15. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, a control field exciting winding for said transformer, means including an auxiliary armature reaction excited dynamo-electric machine arranged to energize said control field exciting winding, means dependent on the speed of said transformer for controlling the voltage of said auxiliary dynamo-electric machine, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, and means dependent on the electrical potential across said primary brushes for opening and closing the circuit of said main load absorbing means circuit connecting means.

16. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means for controlling the rate of acceleration and the rate of braking of said driving motors, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

17. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means dependent on the load on said transformer for disconnecting said primary brushes from said source of electrical power supply, an emergency braking resistor, means for inserting and removing said emergency braking resistor in circuit with said one of said motors between said motor and said dynamo-electric transformer brushes, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

18. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, means dependent on the load on said transformer for disconnecting said primary brushes from said source of electrical power supply, a main control circuit breaker arranged to make and break all of the control circuits of said power system, said load dependent means including a relay arranged to maintain disconnected said primary brushes from said source of electrical power supply when operated to open position until said main control circuit breaker is operated to open all of the control circuits and is reclosed, a main electrical load absorbing means including a main load resistor, means dependent on the electrical potential across said primary brushes for connecting said main load absorbing means across said primary brushes, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

19. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, means including a starting resistance for reducing current surges when said transformer primary brushes are connected by said last-mentioned means to said source of electrical power supply, means for automatically short-circuiting said starting resistance, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means; an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

20. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, a field exciting winding for said rotary transformer, an auxiliary dynamo-electric machine arranged to energize said transformer field exciting winding, means including a field exciting winding for said auxiliary dynamo-electric machine for controlling the rate of acceleration of said driving motors, an emergency electrical load absorbing means including an emergency braking resistor, means for inserting and removing said emergency load absorbing means in circuit with said one of said motors between said motor and said dynamo-electric transformer brushes, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

HAROLD G. MOORE.
FREMONT FELIX.